United States Patent
Kim

(10) Patent No.: US 9,517,725 B2
(45) Date of Patent: Dec. 13, 2016

(54) AUTO REVISING SYSTEM FOR AROUND VIEW MONITORING AND METHOD THEREOF

(71) Applicants: Hyundai Motor Company, Seoul (KR); Kia Motors Corporation, Seoul (KR)

(72) Inventor: Dong Myong Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 107 days.

(21) Appl. No.: 14/675,788

(22) Filed: Apr. 1, 2015

(65) Prior Publication Data

US 2016/0082594 A1   Mar. 24, 2016

(30) Foreign Application Priority Data

Sep. 19, 2014   (KR) .................. 10-2014-0125305

(51) Int. Cl.
| | | |
|---|---|---|
| *B60R 1/00* | (2006.01) | |
| *B60R 1/06* | (2006.01) | |
| *B25J 9/16* | (2006.01) | |
| *B60R 1/08* | (2006.01) | |
| *B25J 11/00* | (2006.01) | |

(52) U.S. Cl.
CPC ............. *B60R 1/00* (2013.01); *B25J 9/1697* (2013.01); *B60R 2300/402* (2013.01); *Y10S 901/02* (2013.01); *Y10S 901/10* (2013.01)

(58) Field of Classification Search
CPC ............. B60R 1/00; B60R 2300/105; B60R 2300/402; G06T 2207/30204; G06T 2207/30208; G06T 2207/30248; G06T 2207/30252; G06T 7/0018
See application file for complete search history.

(56) References Cited

U.S. PATENT DOCUMENTS

| | | | |
|---|---|---|---|
| 2009/0299684 A1 | 12/2009 | Imanishi et al. | |
| 2011/0115922 A1* | 5/2011 | Shimizu ............... | G06T 7/0018 348/188 |
| 2014/0085409 A1* | 3/2014 | Zhang ............... | H04N 5/23238 348/36 |
| 2014/0343729 A1* | 11/2014 | Fudaba ............... | B25J 13/00 700/261 |
| 2015/0168719 A1 | 6/2015 | Kim | |
| 2015/0341629 A1* | 11/2015 | Zeng .................. | H04N 17/002 348/187 |

(Continued)

FOREIGN PATENT DOCUMENTS

| | | |
|---|---|---|
| JP | 2009-288152 A | 12/2009 |
| JP | 2010-103730 A | 5/2010 |

(Continued)

*Primary Examiner* — Khoi Tran
*Assistant Examiner* — Dale Moyer
(74) *Attorney, Agent, or Firm* — Mintz Levin Cohn Ferris Glovsky and Popeo, P.C.; Peter F. Corless

(57) ABSTRACT

An auto revising system for around view monitoring (AVM) includes: one or more target members provided in a space in which a vehicle is assembled, as a reference for a position of the vehicle; a control unit configured to control an AVM system which is installed in the vehicle; and a revising robot unit configured to interface with the control unit to automatically revise a screen of the AVM system based on the one or more target members.

14 Claims, 5 Drawing Sheets

(56) References Cited

U.S. PATENT DOCUMENTS

2015/0356735 A1* 12/2015 Shimizu .................. B60R 1/00
                                                                                             348/148

FOREIGN PATENT DOCUMENTS

| | | |
|---|---|---|
| JP | 2012-078147 A | 4/2012 |
| JP | 2012-240174 A | 12/2012 |
| KR | 10-2011-0055412 A | 5/2011 |
| KR | 10-1210643 B1 | 12/2012 |
| KR | 10-2013-0040595 A | 4/2013 |
| KR | 10-2014-0030755 A | 3/2014 |
| KR | 10-2014-0079623 A | 6/2014 |
| KR | 10-1409313 B1 | 6/2014 |
| KR | 10-1526424 B1 | 6/2015 |

\* cited by examiner

AUTO REVISING SYSTEM FOR AROUND VIEW MONITORING AND METHOD THEREOF

CROSS-REFERENCE TO RELATED APPLICATION

This application claims the benefit of and priority to Korean Patent Application No. 10-2014-0125305, filed on Sep. 19, 2014 in the Korean Intellectual Property Office, the disclosure of which is incorporated herein in its entirety by reference.

TECHNICAL FIELD

The present disclosure relates to an auto revising system for around view monitoring (AVM) and a method thereof, and more particularly, to an auto revising system for AVM and a method thereof capable of automatically revising an AVM system equipped in a vehicle in an unmanned manner.

BACKGROUND

Generally, an AVM system is a technology for providing a view of a vehicle on a navigation screen using several cameras—four cameras, for example—as if the vehicle is being photographed from above. For instance, a camera may be mounted at a front and a rear of a vehicle, as well as left and right side mirrors, respectively. Notably, the AVM system is useful for revising positions of the front, rear, left, and right screens of the vehicle. However, the related art has a problem in that an operator needs to manually revise the AVM system in order to avoid errors at the time of operation and avoid operation efficiency degradation.

SUMMARY

The present disclosure has been made to solve the above-mentioned problems occurring in the related art while advantages achieved by the related art are maintained intact.

An aspect of the present disclosure provides an auto revising system for around view monitoring (AVM) and a method thereof. More particularly, an aspect of the present disclosure is to automatically revise an AVM system equipped in a vehicle in an unmanned manner.

According to embodiments of the present disclosure, an auto revising system for AVM includes: one or more target members provided in a space in which a vehicle is assembled, as a reference for a position of the vehicle; a control unit configured to control an AVM system which is installed in the vehicle; and a revising robot unit configured to interface with the control unit to automatically revise a screen of the AVM system based on the one or more target members.

The revising robot unit may include an operating arm which moves in all directions.

The revising robot unit may include: a camera mounted at the operating arm to monitor the screen of the AVM system and transmit an image to the control unit, a touch probe configured to operate the screen of the AVM system to control the AVM system, and a gripper mounted at the operating arm to fix the touch probe.

The one or more target members may be each provided at a front, a side, and a rear of the vehicle.

The touch probe may be made of a soft material.

The touch probe may be formed at a tip of the revising robot unit.

The gripper may be provided to have a controllable length.

The camera may be positioned over the gripper to simultaneously monitor the touch probe and the screen of the AVM system.

Furthermore, according to embodiments of the present disclosure, an auto revising method for AVM includes: a first step of controlling, by a revising robot unit interfacing with a control unit, a screen of an AVM system for a front image of a vehicle; a second step of controlling, by the revising robot unit, the screen of the AVM system for a rear image after the first step; a third step of controlling, by the revising robot unit, the screen of the AVM system for a left image after the second step; and a fourth step of controlling, by the revising robot unit, the screen of the AVM system for a right image after the third step.

The first step may include: clicking, by the revising robot unit, a first point which is flickered at an upper left of the screen of the AVM system; switching the first point to a non-flickered state when clicking the first point; clicking, by the revising robot unit, a second point when the second point which is flickered at a lower left is generated; switching the second point to a non-flickered state when clicking the second point; clicking, by the revising robot unit, a third point when the third point which is flickered at an upper right is generated; switching the third point to a non-flickered state when clicking the third point; clicking, by the revising robot unit, a fourth point when the fourth point which is flickered at a lower right is generated; and completing a screen revision of the AVM system for the front image of the vehicle by clicking, by the revising robot unit, an update button on the screen of the AVM system, while the first to fourth points are deleted due to clicking the fourth point.

The second step may include: clicking, by the revising robot unit, the first point which is flickered at the upper left of the screen of the AVM system while automatically switching the screen of the AVM system to the rear image of the vehicle when the screen revision of the AVM system for the front image of the vehicle is completed; switching the first point to the non-flickered state when clicking the first point; clicking, by the revising robot unit, the second point when the second point which is flickered at the lower left is generated; switching the second point to the non-flickered state when clicking the second point; clicking, by the revising robot unit, the third point when the third point which is flickered at the upper right is generated; switching the third point to the non-flickered state when clicking the third point; clicking, by the revising robot unit, the fourth point when the fourth point which is flickered at the lower right is generated; and completing a screen revision of the AVM system for the rear image of the vehicle by clicking, by the revising robot unit, the update button on the screen of the AVM system, while the first to fourth points are deleted due to clicking the fourth point.

The third step may include: clicking, by the revising robot unit, the first point which is flickered at the upper left of the screen of the AVM system while automatically switching the screen of the AVM system to the left image of the vehicle when the screen revision of the AVM system for the rear image of the vehicle is completed; switching the first point to the non-flickered state when clicking the first point; clicking, by the revising robot unit, the second point when the second point which is flickered at the lower left is generated; switching the second point to the non-flickered state when clicking the second point; clicking, by the revising robot unit, the third point when the third point which is flickered at the upper right is generated; switching the third point to the non-flickered state when clicking the third point; clicking, by the revising robot unit, the fourth point when the fourth point which is flickered at the lower right is generated; and completing a screen revision of the AVM system for the rear image of the vehicle by clicking, by the revising robot unit, the update button on the screen of the AVM system, while the first to fourth points are deleted due to clicking the fourth point.

The fourth step may include: clicking, by the revising robot unit, the first point which is flickered at the upper left of the screen of the AVM system while automatically switching the screen of the AVM system to the right image of the vehicle when the screen revision of the AVM system for the left image of the vehicle is completed; switching the first point to a non-flickered state when clicking the first point; clicking, by the revising robot unit, the second point when the second point which is flickered at the lower left is generated; switching the second point to the non-flickered state when clicking the second point; clicking, by the revising robot unit, the third point when the third point which is flickered at the upper right is generated; switching the third point to the non-flickered state when clicking the third point; clicking, by the revising robot unit, the fourth point when the fourth point which is flickered at the lower right is generated; and completing a screen revision of the AVM system for the rear image of the vehicle by clicking, by the revising robot unit, the update button on the screen of the AVM system, while the first to fourth points are deleted due to clicking the fourth point.

Furthermore, according to embodiments of the present disclosure, an auto revising system for AVM includes: one or more target members provided at front-left and front-right sides, side-left and side-right sides, and rear-left and rear-right sides of a space in which a vehicle is assembled, as a target for the vehicle; a control unit configured to control an AVM system which is installed in the vehicle; and a revising robot unit configured to interface with the control unit to automatically revise the AVM system based on the one or more target members and having a touch probe that operates a screen of the AVM system installed at an operating arm of the revising robot unit which moves in all directions.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
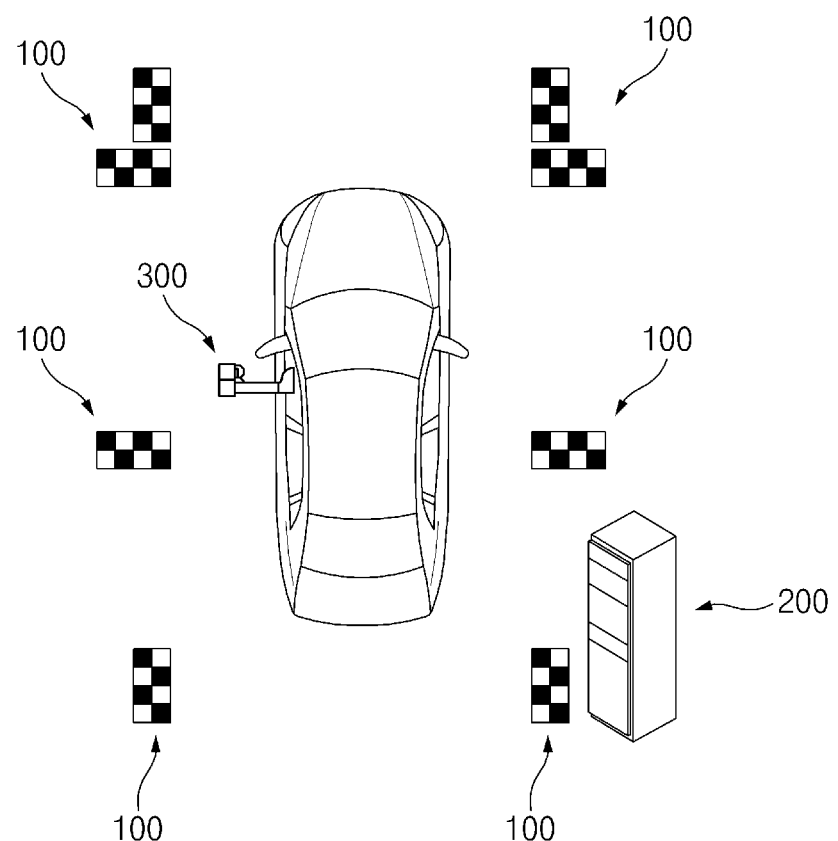
FIG. 1 is a diagram illustrating an auto revising system for AVM according to embodiments of the present disclosure.

Embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Figure 2:
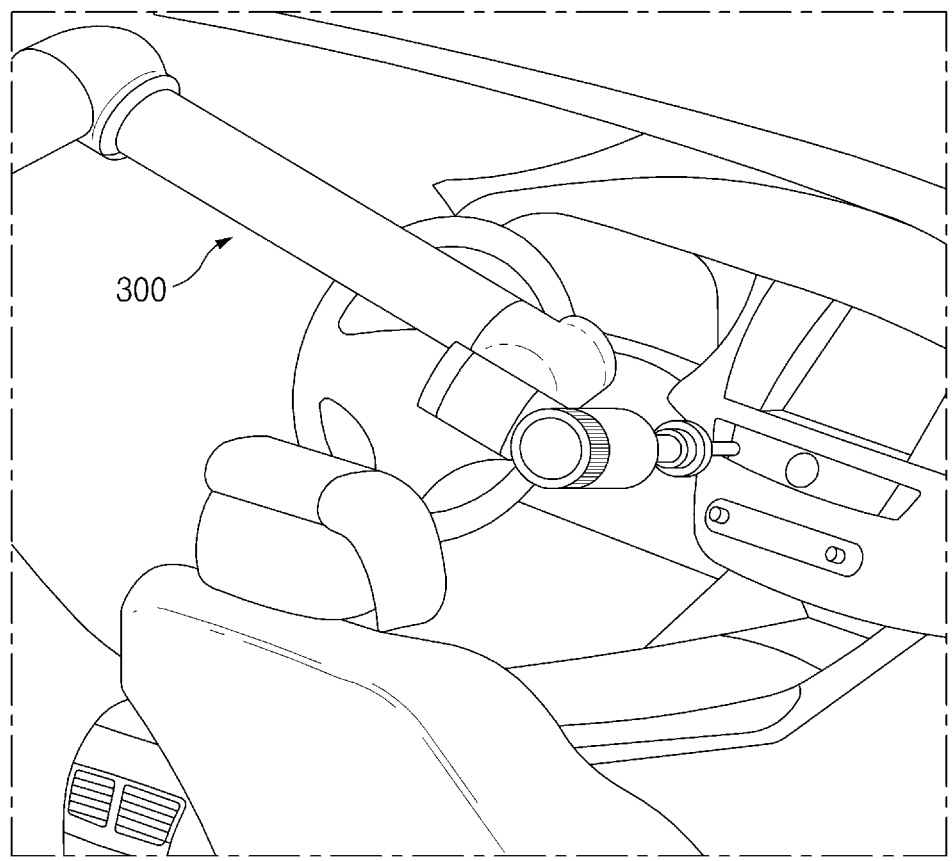
FIG. 2 is a diagram illustrating an operation of a revising robot unit in the auto revising system for AVM according to embodiments of the present disclosure.
Figure 3:
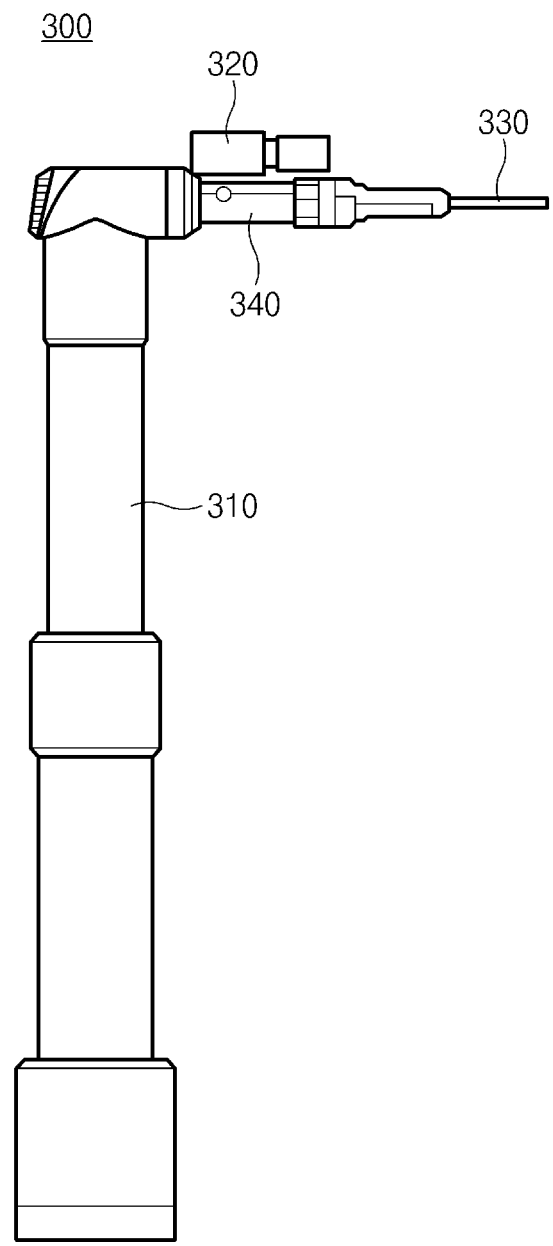
FIG. 3 is a diagram illustrating the revising robot unit in the auto revising system for AVM according to embodiments of the present disclosure.

As illustrated in FIGS. 1 to 3, an auto revising system for AVM according to embodiments of the present disclosure includes target members 100 configured to set a reference for a position of a vehicle, a control unit 200 configured to control an AVM system, and a revising robot unit 300 configured to automatically revise a screen of the AVM system.

As illustrated in FIG. 1, the target member(s) 100 is formed in a space in which a vehicle is installed. Describing in more detail, the target member(s) 100 is formed on a bottom surface of a working area for setting an auto revising system for AVM according to embodiments of the present disclosure and thus may be a reference for a position of the vehicle. In this case, the target member(s) 100 is formed at front-left and front-right sides of the bottom surface, side-left and side-right sides, and rear-left and rear-right sides, and thus may be formed at a total of six positions, such that the reference target for the positioning of the vehicle may be set in all directions.

The control unit 200 is configured to control an around view monitoring (AVM) system which is equipped in the vehicle and may revise the AVM system based on the target member 100 using the revising robot unit 300 to be described below.

As illustrated in FIGS. 1 and 2, the revising robot unit 300 interfaces (e.g., operably couples) with the control unit 200 to automatically revise the screen of the AVM system based on the target member 100. In this case, the revising robot unit 300 is mounted on the bottom surface of the space in which the vehicle is mounted and includes an operating arm 310 which may move in all directions.

Meanwhile, as illustrated in FIGS. 1 to 3, the revising robot unit 300 includes a camera 320 configured to be mounted at the operating arm 310 to monitor a screen of the AVM system and transmit an image to the control unit 200, a touch probe 330 configured to operate the screen of the AVM system to substantially revise the AVM system, and a gripper 340 configured to be mounted at the operating arm 310 to fix the touch probe 330. In this case, the touch probe 330 may be made of a soft material to protect the screen of the AVM system. Further, the touch probe 330 may be formed at a tip of the revising robot unit 300 to facilitate the operation of the screen of the AVM system.

The gripper 340 is provided to have a controllable length to facilitate the operation of the screen of the AVM system using the revising robot unit 300. Meanwhile, the camera 320 may be disposed over the gripper 340 which fixes the touch probe 330 to simultaneously monitor the touch probe 330 and the screen of the AVM system.

Further, according to embodiments of the present disclosure, an auto revising system for AVM includes the target members 100 configured to be provided at the front-left and front-right sides, the side-left and side-right sides, and the rear-left and rear-right sides of the space in which the vehicle is installed (e.g., assembled) and be a target for the vehicle, the control unit 200 configured to control the AVM system installed in the vehicle, and the revising robot unit 300 configured to interfaces with the control unit 200 to automatically revise the AVM system based on the target member(s) 100 and have the touch probe 330 operating the screen of the AVM system installed at the an operating arm 310 which may move in all directions. That is, according to embodiments of the present disclosure, the auto revising system for AVM includes the target members 100 which are a reference of the position of the vehicle, the control unit 200 configured to control the AVM system, and the revising robot unit 300 configured to interface with the control unit 200 to automatically revise the screen of the AVM system based on the target member 100, such that the AVM system which is installed in the vehicle is automatically revised by a robot, thereby improving operation efficiency.

Figure 4:
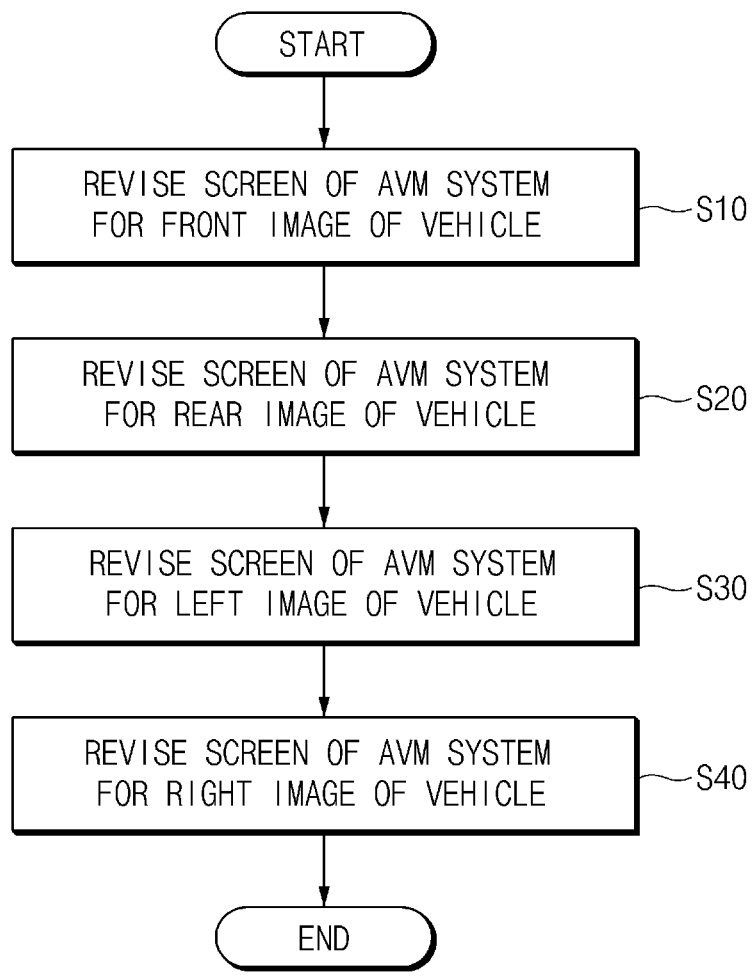
FIG. 4 is a flow chart illustrating an auto revising method for AVM according to embodiments of the present disclosure.

Further, according to embodiments of the present disclosure, as illustrated in FIG. 4, an auto revising method for AVM includes a first step (S10) of revising the screen of the AVM system for a front image of a vehicle, a second step (S20) of revising the screen of the AVM system for a rear image, a third step (S30) of revising the screen of the AVM system for a left image, and a fourth step (S40) of revising the screen of the AVM system for a right image. Meanwhile, a configuration associated with the auto revising system for AVM will be described with reference to FIGS. 1 to 3.

In the first step (S10), the screen of the AVM system for the front image of the vehicle is revised by the revising robot unit 300 interfacing with the control unit 200. The revising of the front image of the vehicle of the first step (S10) is a process of matching positions of the target members 100 provided at the front-left and front-right sides with the position of the screen of the AVM system, in which the process further includes the following steps.

Figure 5:
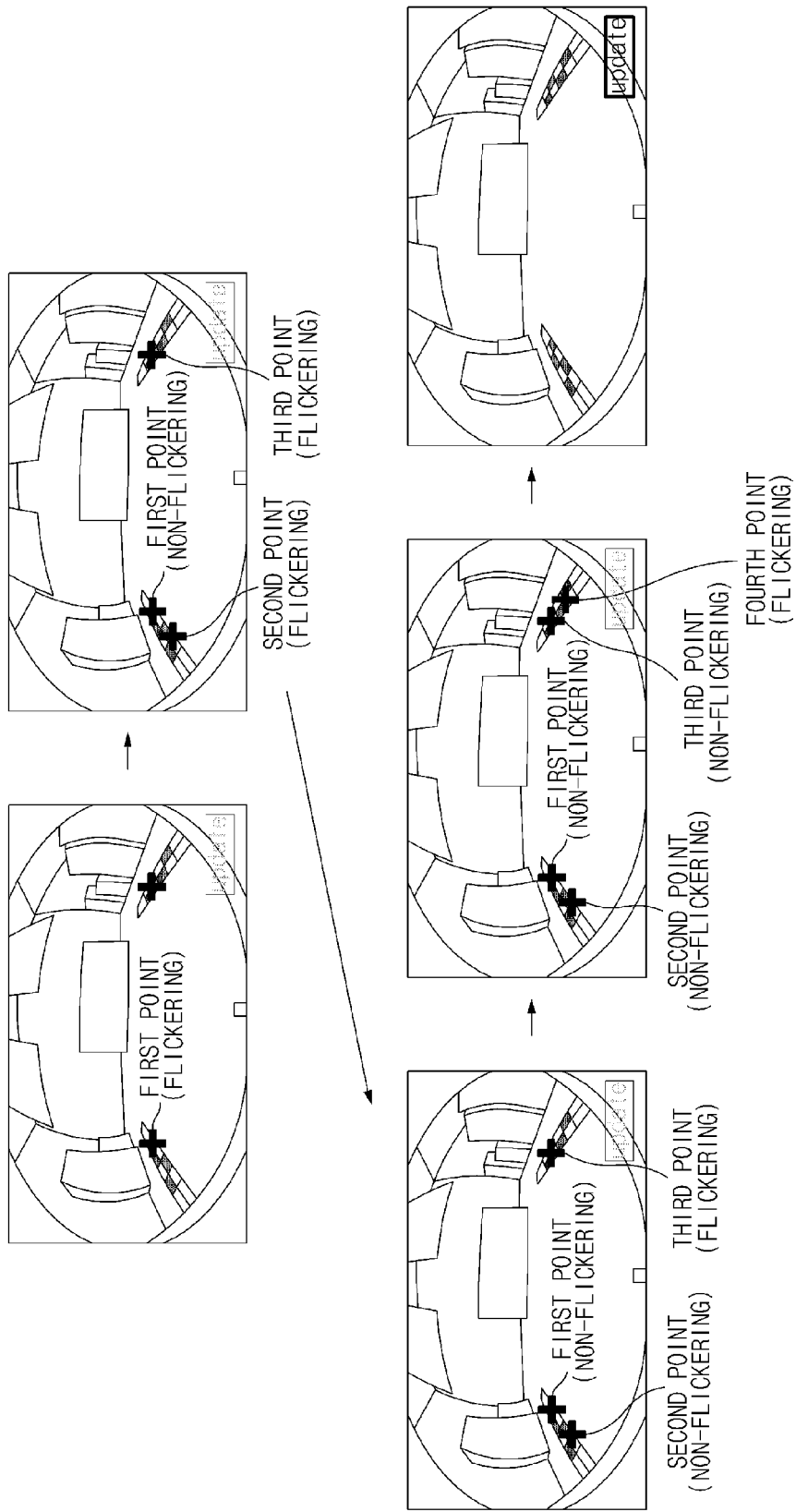
FIG. 5 is a diagram illustrating an AVM system revising process for a front image of a vehicle in the auto revising method for AVM according to embodiments of the present disclosure.

As illustrated in FIG. 5, the first step (S10) includes clicking, by the revising robot unit 300, a first point which is flickered at an upper left of the screen of the AVM system, switching the first point to the non-flickered state at the time of normally clicking the first point and clicking, by the revising robot unit 300, a second point when a second point flickered at a lower left is generated, switching the second point to a non-flickered state at the time of normally clicking the second point and clicking, by the revising robot unit 300, a third point when the third point flickered at an upper right is generated, switching the third point to a non-flickered state at the time of normally clicking the third point and clicking, by the revising robot unit 300, a fourth point when a fourth point flickered at a lower right is generated, and completing the screen revision of the AVM system for the front image of the vehicle by clicking an update button on the screen of the AVM system while the first to fourth points are deleted at the time of normally clicking the fourth point in the previous step.

In the second step (S20), the screen of the AVM system for the rear image of the vehicle is revised by the revising robot unit 300 interfacing with the control unit 200. In this case, the revising of the rear image of the vehicle of the second step (S20) is a process of matching the positions of the target members 100 provided at the rear left and right sides with the position of the screen of the AVM system, in which the process further includes the following steps. The second step (S20) includes of clicking, by the revising robot unit 300, the first point flickered at the upper left of the screen of the AVM system while automatically switching the screen of the AVM system to the rear image of the vehicle when the screen revision of the AVM system for the front image of the vehicle is completed, switching the first point to a non-flickered state at the time of normally clicking the first point and clicking, by the revising robot unit 300, the second point when the second point flickered at the lower left is generated, switching the second point to the non-flickered state at the time of normally clicking the second point and clicking, by the revising robot unit 300, the third point when the third point flickered at the upper right is generated, switching the third point to the non-flickered state at the time of normally clicking the third point and clicking, by the revising robot unit 300, the fourth point when the fourth point flickered at the lower right is generated, and completing the screen revision of the AVM system for the rear image of the vehicle by clicking the update button on the screen of the AVM system while the first to fourth points are deleted at the time of normally clicking the fourth point in the previous step.

In the third step (S30), the screen of the AVM system for the left image of the vehicle is revised by the revising robot unit 300 interfacing with the control member(s) 200. In this case, the revising of the left image of the vehicle of the third step (S30) is a process of matching the positions of the target member(s) 100 provided at the left side with the position of the screen of the AVM system, in which the process further includes the following steps. The third step (S30) includes clicking, by the revising robot unit 300, the first point flickered at the upper left of the screen of the AVM system while automatically switching the screen of the AVM system to the left image of the vehicle when the screen revision of the AVM system for the rear image of the vehicle is completed, switching the first point to a non-flickered state at the time of normally clicking the first point clicking, by the revising robot unit 300, the second point when the second point flickered at the lower left is generated, switching the second point to the non-flickered state at the time of normally clicking the second point and clicking, by the revising robot unit 300, the third point when the third point flickered at the upper right is generated, switching the third point to the non-flickered state at the time of normally clicking the third point and clicking, by the revising robot unit 300, the fourth point when the fourth point flickered at the lower right is generated, and completing the screen revision of the AVM system for the rear image of the vehicle by clicking the update button on the screen of the AVM system while the first to fourth points are deleted at the time of normally clicking the fourth point in the previous step.

In the fourth step (S40), the screen of the AVM system for the right image of the vehicle is revised by the revising robot unit 300 interfacing with the control unit 200. In this case, the revising of the right image of the vehicle of the fourth step (S40) is a process of matching the positions of the target member(s) 100 provided at the right side with the position of the screen of the AVM system, in which the process further includes the following steps. The fourth step (S40) includes clicking, by the revising robot unit 300, the first point flickered at the upper left of the screen of the AVM system while automatically switching the screen of the AVM system to the right image of the vehicle when the screen revision of the AVM system for the left image of the vehicle is completed, switching the first point to a non-flickered state at the time of normally clicking the first point and clicking, by the revising robot unit 300, the second point when the second point flickered at the lower left is generated, switching the second point to the non-flickered state at the time of normally clicking the second point and clicking, by the revising robot unit 300, the third point when the third point flickered at the upper right is generated, switching the third point to the non-flickered state at the time of normally clicking the third point and clicking, by the revising robot unit 300, the fourth point when the fourth point flickered at the lower right is generated, and completing the screen revision of the AVM system for the rear image of the vehicle by clicking the update button on the screen of the AVM system while the first to fourth points are deleted at the time of normally clicking the fourth point in the previous step.

As described above, according to embodiments of the present disclosure, it is possible to increase the operation efficiency by automatically revising the AVM system equipped in the vehicle by a robot, not manually (e.g., by a person) and increase the operation reliability by reducing the occurrence of operation errors by constructing the unmanned process.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An auto revising system for around view monitoring (AVM), comprising:
   one or more target members provided in a space in which a vehicle is assembled, as a reference for a position of the vehicle;
   a control unit configured to control an AVM system which is installed in the vehicle; and
   a revising robot unit configured to interface with the control unit to automatically revise a screen of the AVM system based on the one or more target members.

2. The auto revising system for AVM according to claim 1, wherein the revising robot unit includes an operating arm which moves in all directions.

3. The auto revising system for AVM according to claim 2, wherein the revising robot unit includes:
   a camera mounted at the operating arm to monitor the screen of the AVM system and transmit an image to the control unit,
   a touch probe configured to operate the screen of the AVM system to control the AVM system, and
   a gripper mounted at the operating arm to fix the touch probe.

4. The auto revising system for AVM according to claim 3, wherein the touch probe is made of a soft material.

5. The auto revising system for AVM according to claim 3, wherein the touch probe is formed at a tip of the revising robot unit.

6. The auto revising system for AVM according to claim 3, wherein the gripper is provided to have a controllable length.

7. The auto revising system for AVM according to claim 3, wherein the camera is positioned over the gripper to simultaneously monitor the touch probe and the screen of the AVM system.

8. The auto revising system for AVM according to claim 1, wherein the one or more target members are each provided at a front, a side, and a rear of the vehicle.

9. An auto revising method for AVM, comprising:
   a first step of controlling, by a revising robot unit interfacing with a control unit, a screen of an AVM system for a front image of a vehicle;
   a second step of controlling, by the revising robot unit, the screen of the AVM system for a rear image after the first step;
   a third step of controlling, by the revising robot unit, the screen of the AVM system for a left image after the second step; and
   a fourth step of controlling, by the revising robot unit, the screen of the AVM system for a right image after the third step.

10. The auto revising method for AVM according to claim 9, wherein the first step includes:
    clicking, by the revising robot unit, a first point which is flickered at an upper left of the screen of the AVM system;
    switching the first point to a non-flickered state when clicking the first point;
    clicking, by the revising robot unit, a second point when the second point which is flickered at a lower left is generated;
    switching the second point to a non-flickered state when clicking the second point;
    clicking, by the revising robot unit, a third point when the third point which is flickered at an upper right is generated;
    switching the third point to a non-flickered state when clicking the third point;
    clicking, by the revising robot unit, a fourth point when the fourth point which is flickered at a lower right is generated; and
    completing a screen revision of the AVM system for the front image of the vehicle by clicking, by the revising robot unit, an update button on the screen of the AVM system, while the first to fourth points are deleted due to clicking the fourth point.

11. The auto revising method for AVM according to claim 10, wherein the second step includes:
    clicking, by the revising robot unit, the first point which is flickered at the upper left of the screen of the AVM system while automatically switching the screen of the AVM system to the rear image of the vehicle when the screen revision of the AVM system for the front image of the vehicle is completed;

switching the first point to the non-flickered state when clicking the first point;

clicking, by the revising robot unit, the second point when the second point which is flickered at the lower left is generated;

switching the second point to the non-flickered state when clicking the second point;

clicking, by the revising robot unit, the third point when the third point which is flickered at the upper right is generated;

switching the third point to the non-flickered state when clicking the third point;

clicking, by the revising robot unit, the fourth point when the fourth point which is flickered at the lower right is generated; and completing a screen revision of the AVM system for the rear image of the vehicle by clicking, by the revising robot unit, the update button on the screen of the AVM system, while the first to fourth points are deleted due to clicking the fourth point.

12. The auto revising method for AVM according to claim 11, wherein the third step includes:

clicking, by the revising robot unit, the first point which is flickered at the upper left of the screen of the AVM system while automatically switching the screen of the AVM system to the left image of the vehicle when the screen revision of the AVM system for the rear image of the vehicle is completed;

switching the first point to the non-flickered state when clicking the first point;

clicking, by the revising robot unit, the second point when the second point which is flickered at the lower left is generated;

switching the second point to the non-flickered state when clicking the second point;

clicking, by the revising robot unit, the third point when the third point which is flickered at the upper right is generated;

switching the third point to the non-flickered state when clicking the third point;

clicking, by the revising robot unit, the fourth point when the fourth point which is flickered at the lower right is generated; and completing a screen revision of the AVM system for the rear image of the vehicle by clicking, by the revising robot unit, the update button on the screen of the AVM system, while the first to fourth points are deleted due to clicking the fourth point.

13. The auto revising method for AVM according to claim 12, wherein the fourth step includes:

clicking, by the revising robot unit, the first point which is flickered at the upper left of the screen of the AVM system while automatically switching the screen of the AVM system to the right image of the vehicle when the screen revision of the AVM system for the left image of the vehicle is completed;

switching the first point to a non-flickered state when clicking the first point;

clicking, by the revising robot unit, the second point when the second point which is flickered at the lower left is generated;

switching the second point to the non-flickered state when clicking the second point;

clicking, by the revising robot unit, the third point when the third point which is flickered at the upper right is generated;

switching the third point to the non-flickered state when clicking the third point;

clicking, by the revising robot unit, the fourth point when the fourth point which is flickered at the lower right is generated; and completing a screen revision of the AVM system for the rear image of the vehicle by clicking, by the revising robot unit, the update button on the screen of the AVM system, while the first to fourth points are deleted due to clicking the fourth point.

14. An auto revising system for AVM, comprising:

one or more target members provided at front-left and front-right sides, side-left and side-right sides, and rear-left and rear-right sides of a space in which a vehicle is assembled, as a target for the vehicle;

a control unit configured to control an AVM system which is installed in the vehicle; and a revising robot unit configured to interface with the control unit to automatically revise the AVM system based on the one or more target members and having a touch probe that operates a screen of the AVM system installed at an operating arm of the revising robot unit which moves in all directions.

\* \* \* \* \*